United States Patent
Buczek et al.

(10) Patent No.: US 6,649,256 B1
(45) Date of Patent: Nov. 18, 2003

(54) ARTICLE INCLUDING PARTICLES ORIENTED GENERALLY ALONG AN ARTICLE SURFACE AND METHOD FOR MAKING

(75) Inventors: Matthew B. Buczek, Fairfield, OH (US); Andrew J. Skoog, West Chester, OH (US); Jane A. Murphy, Middletown, OH (US); Daniel G. Backman, Melrose, MA (US); Israel S. Jacobs, Schenectady, NY (US); John F. Ackerman, Laramie, WY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/489,717

(22) Filed: Jan. 24, 2000

(51) Int. Cl.$^7$ .................................................. B32B 5/16
(52) U.S. Cl. ...................... 428/323; 428/328; 428/329; 428/330; 428/338; 428/413; 428/492; 428/31; 427/547

(58) Field of Search .......................... 428/31, 323, 328, 428/329, 330, 338, 413, 492; 427/547

(56) References Cited

U.S. PATENT DOCUMENTS

| | | | | |
|---|---|---|---|---|
| 2,996,709 A | * | 8/1961 | Pratt et al. | ...................... 343/18 |
| 4,889,766 A | * | 12/1989 | Inuzuka et al. | ............. 428/324 |
| 6,156,379 A | * | 12/2000 | Terada et al. | ............... 427/214 |

* cited by examiner

Primary Examiner—Leszek Kiliman
(74) Attorney, Agent, or Firm—Carmen Santa Maria; McNees Wallace & Nurick LLP

(57) ABSTRACT

Non-spherical particles including a major dimension, for example flakes of material, are positioned with the major dimension oriented generally along an article surface in respect to which the particle is disposed. The particles, disposed in a fluid medium, the viscosity of which can be increased to secure the particles in position, are positioned using a force on the particles. The force includes torque force from a magnetic field, force from flow of the fluid medium, the force of gravity, and the force of surface tension alone or in combination with the force of gravity.

5 Claims, 4 Drawing Sheets

ARTICLE INCLUDING PARTICLES ORIENTED GENERALLY ALONG AN ARTICLE SURFACE AND METHOD FOR MAKING

BACKGROUND OF THE INVENTION

This invention relates to coatings, films and sheets including non-spherical particles. More particularly, it relates to a coated article and method for orienting such particles with respect to an article surface.

Coatings such as films and paints, as well as sheets of material, frequently are used to provide an artistic effect on a surface of an article. For control of brightness of or reflection from a surface, coatings and sheets have used non-spherical metallic particles in the shape of flakes having a major dimension, with the relative orientation of the flake and the major dimensions in respect to the article surface determining the degree of brightness or reflection. In addition, bright films and sheets are useful because of certain physical properties such as that of reducing emission of heat from a surface. Such coatings have been applied to components of power generating apparatus, for example turbine engine components, as well as to components of vehicles, for example surface members of airplanes, boats, automobiles, etc.

A number of methods for using a magnetic field for controlling the orientation of non-spherical particles, such as metallic flakes, in a coating on an article have been reported. Other reported methods employ an ion effect or corona for flake positioning.

In U.S. Pat. No. 2,418,479—Pratt et al. (patented Apr. 8, 1947), metallic flake pigments, such as ferromagnetic flakes, in paint films are positioned on a simple, planar surface by reaction to a magnetic field. Both the article surface and the flakes are located in the direction of the magnetic field. The flakes rotate as a result of a torque force from the magnetic field. This method requires that the article surface on which the film is disposed lie between magnetic poles so that each long or major dimension of the particles will align itself along the magnetic field direction, as does the needle of a compass. Use of this method is impractical for large surfaces of articles since the magnetic field strength would have to be extremely large and costly to construct. In addition, such method as described would not operate to orient a majority of the flakes disposed in a film or coating on a curved or complex shaped, non-planar article surface. One example of such a surface is an annular or airfoil shaped component of power generating apparatus such as a gas turbine engine.

Another method using a magnetic field to orient or de-orient such non-spherical particles at localized surface areas of an article is reported in U.S. Pat. No. 5,630,877—Kashiwagi et al. (patented May 20, 1997), in order to produce visually discernible patterns. That method impresses a desired pattern on an article surface of the particles in various different positions of orientation with respect to the surface using a shaped magnet held in a fixed position to the surface. When the magnetic field is applied at the fixed position, the orientation of the particles at the various angles to the article surface is determined by location of each particle in the fixed magnetic field and the relative strength and torque of the fixed magnetic field on the particles. The magnet must remain in a fixed position because any movement of the magnetic field along the article surface would destroy the desired pattern of the particles at the different orientations.

Methods reported in such patents as U.S. Pat. Nos. 4,818,627 and 4,911,947—Melcher et al. (patented Apr. 4, 1989 and Mar. 27, 1990, respectively) subject metallic particles on a film on an electrically conductive substrate to a corona or ion current. This orients the particles substantially in the direction of the current, generally substantially perpendicular to the article surface.

BRIEF SUMMARY OF THE INVENTION

The present invention provides an article, in one form including a non-planar article surface coated with non-spherical particles, and in another form as a sheet of material including a sheet or article surface substantially along the plane of the sheet. Each particle includes a major dimension with an average of at least about 50% of the particles having the major dimension oriented generally along the article surface in respect to which each particle is disposed.

In another form, the present invention provides a method for orienting with respect to an article surface a plurality of non-spherical particles each including a major dimension and each of which can be moved by a force on the particles. The particles are disposed in respect to the article surface in a fluid medium the viscosity of which can be increased to secure the particles in a position.

In one form of such method, substantially parallel relative movement between a magnetic field, and each particle and the article surface in respect to which each particle is disposed, is provided. The magnetic field is disposed with its direction relative to the particles and the article surface so that, during the relative movement, the magnetic field will locate an average of at least about 50% of the major dimensions in a position generally along the article surface in respect to which each particle is disposed. This relative movement between the particles and the magnetic field moves the particles by a torque force from the magnetic field to their respective position. After particle positioning, the viscosity of the medium is increased to secure the particles in the positions.

In another form of such method, the force on the particles to orient the particles generally along the article surface is provided by inducing flow in a medium carrying the particles. Such force on the medium applies a force to turn the particles in the direction of flow. Such medium flow disposes the particles each with their major dimension generally along to the article surface. Resulting from this form of the method are several forms of articles: one is an article including a coating on an article surface; another is a sheet of material. The non-spherical particles are oriented with the major dimension oriented generally along either the article surface on which the coating is disposed or the plane of the sheet that includes the particles, as the article surface.

In still another form of such method, the force on the particles to orient a majority of the major dimensions of the particles generally along the article surface is the force of gravity. Gravity is allowed to act on the particles while the medium is maintained in a fluid state for a time sufficient to enable a majority of the major dimensions of the particles to become so oriented.

In a further form of the present invention, the force on the particles to provide such orientation is the surface tension of the fluid medium that is selected to provide such a force.

DETAILED DESCRIPTION OF THE INVENTION

Figure 1:
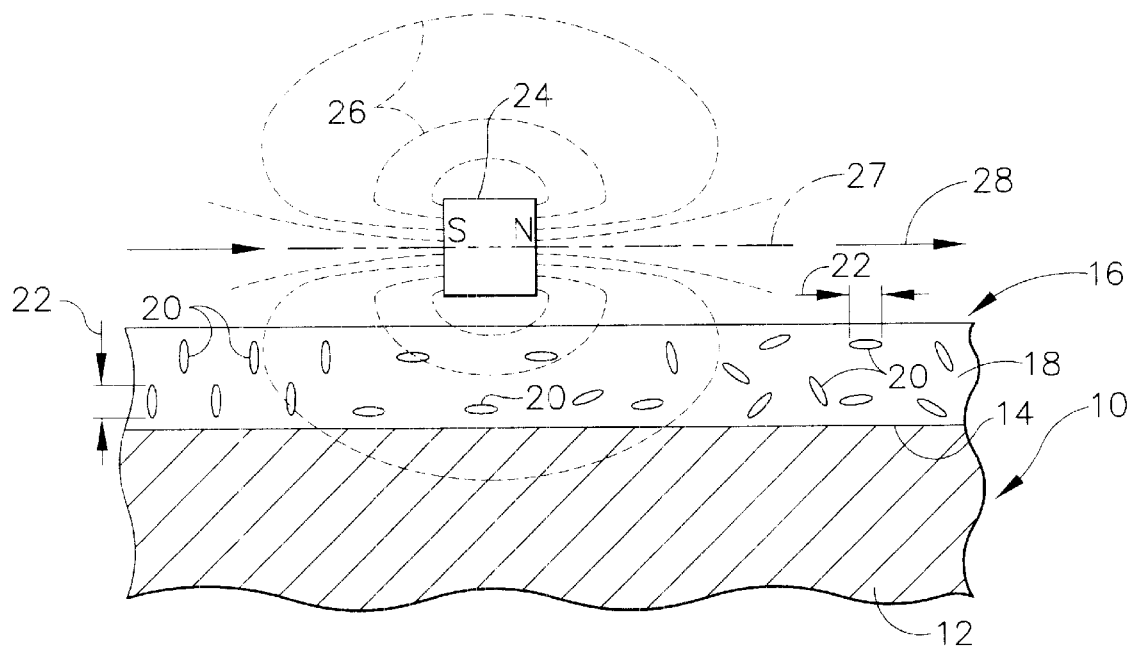
FIG. 1 is a diagrammatic fragmentary sectional view of a coated article with an improper magnet and magnetic field orientation and positioning for relative parallel movement between a magnet and the particles.

Advantages of the method of the present invention include its capability to be used with large, non-planar complex shaped surfaces of articles rather than being limited to substantially planar, linear article surfaces. An important feature of the present method is that it can be practiced with relatively simple apparatus requiring access from only one side of an article to enable the substantially parallel relative movement in respect to a complex shaped article surface. Also, such method does not require that the surface or substrate be conductive or reactive to a magnetic field, although the present invention can be practiced with such a substrate. In the method form of the present invention, the non-spherical particles are moved or oriented while the medium or matrix carrying the particles is sufficiently fluid or maintained in a fluid condition sufficient to enable orientation or movement of the particles. After orientation, the viscosity of the medium or matrix is increased appropriately to secure the particles in position.

Provided in one form is an article including a non-planar surface coated with non-spherical particles, each particle including a major dimension. It is well established that a purely random sample of non-spherical particles, for example flakes of material, will by nature be oriented generally along or substantially parallel to a surface over which the particles are disposed in a fluid matrix in an amount of about 33%. According to the present invention, an average of at least about 50% of the particles is oriented with the major dimension generally along the article surface over which the particle is disposed.

A preferred form of the method of the present invention uses a magnetic field to apply a torque force to non-spherical particles that can be moved, at least generally in rotation, when subjected to such a force. For example, the particles can be or have a core of a magnetic material, typical of which is a metal based on Fe, Ni, Co or their alloys. In another form, non-magnetic particles can be coated with a material that will react with such a torque force. A convenient form of non-spherical particles is as flakes of material, for example ferromagnetic flakes. Soft magnetic materials, as that term is used in the art for example in U.S. Pat. No. 5,827,445—Yoshida et al. (patented Oct. 27, 1998), are preferred for use in this form of the method of the present invention. Soft magnetic materials tend not to become permanently magnetized as would hard magnetic materials.

The present invention will be more fully understood by reference to the drawings. A preferred form of the method of the present invention uses a magnetic field to generate a torque force on a particle for selective movement. Disposition or positioning of the direction of the magnetic field, for example positioning of the N-S poles of a magnet, relative to an article surface and particles disposed over an article surface is important to that form of the present method in which the magnetic field and the particles are moved physically relative one to the other and substantially parallel with the article surface.

The diagrammatic view of FIG. 1 shows a magnetic field orientation and positioning improper according to the present invention when relative parallel movement is provided between a magnetic field, and each non-spherical particle and the article surface with respect to which each particle is disposed. A coated article shown generally at 10 includes a substrate 12, shown for convenience to be metallic although non-conductive or non-metallic substrates can be employed with the present invention. Disposed on surface 14 of substrate 12 is a coating shown generally at 16. Coating 16 includes a matrix 18, for example a non-metallic polymeric material such as an epoxy resin or other plastic, curable or hardenable material generally used in coatings to carry pigments.

During practice of one form of the method associated with the present invention, matrix or medium 18 was maintained in a fluid condition for a time sufficient to enable desired movement of particles in the matrix. Disposed in matrix 18 is a plurality of non-spherical particles 20, shown in the form of metallic flakes, each having a major dimension 22 greater than other dimensions of the flake. In a typical relatively thin flake of material, a major dimension is a length of the flake compared with its thickness. In a generally disk or coin shaped flake, a major dimension is a diameter of the flake compared with its thickness. The particles are of a material that will react with or be affected by a magnetic field.

In FIG. 1, carried spaced apart from article surface 14, coating 16 and particles 20 is a magnet 24 with its N-S poles positioned substantially parallel with article surface 14. Magnetic lines of force from magnet 24, representing both permanent magnets and electromagnets, are shown in a magnetic field 26 as broken lines in a pattern typical of magnets. Magnet 24 in its position in FIG. 1 disposes magnetic field 26 with its direction along line 27. If a magnet is held in a fixed position opposite such particles, for example as shown in FIG. 1 or in FIG. 2, and no relative movement is provided with respect to surface 14, the various orientations of the particles in respect to magnetic field 26 and surface 14 will generally be as shown in the above identified U.S. Pat. No. 5,630,877—Kashiwagi et al.

It is well known that a magnetic field comprises a relatively strong near-field generally about a core area of a magnet, a mid-field adjacent and somewhat removed from the core area and of less strength than the near-field, and a far-field adjacent the mid-field, farthest from the core area and the weakest of the fields. Thus, the effect of a magnetic field on such a particle is strongest in the near field and weakest in the far field. The different orientations of the particles reacting to a fixed magnetic field are a function of each particle's position in the magnetic field.

If magnetic field 26, resulting from magnet 24 positioned as shown in FIG. 1, is moved substantially parallel to particles 20 and surface 14, as shown by arrow 28, it has been observed that the effect of a torque force on particles 20, generated by magnetic field 26, will be to move, such as by rotating, and located each particle to a final position in which its major dimension 22 will be substantially perpendicular to surface 14. This final positioning from the arrangement of FIG. 1 occurs after magnetic field 26 disposed in direction 27, has passed the particle and its respective article surface. Such position is the result of the effect of the near-field, the mid-field and the far-field sequentially passing each particle. In addition, the position is a function of the strength and relative movement of the magnetic field, the distance the magnet is carried from the particle, and the viscosity of a matrix in which the particle is disposed. Brightness of or reflection from such particles in a coating is greatly reduced by such particle perpendicular orientation, as has been widely described in the literature, for example the patents identified above.

Figure 2:
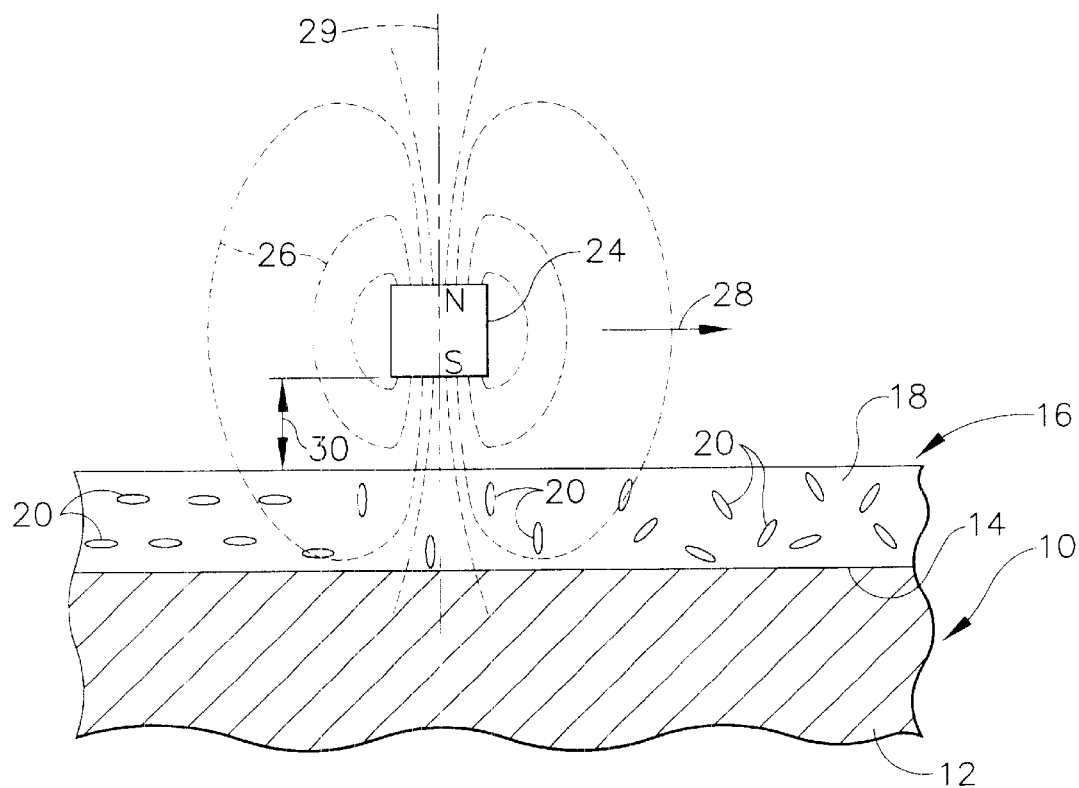
FIG. 2 is a diagrammatic fragmentary sectional view of a coated article with proper magnetic field and magnet positioning in one form of the method of the invention for relative parallel movement between a magnet and the particles.

In contrast with the undesirable arrangement in FIG. 1 is the positioning and movement of magnetic field 26 in FIG. 2, representing one form of the article and of the method of the present invention. In FIG. 2, magnetic field 26 is disposed in a direction shown by line 29 as a result of magnet 24 being carried with its N-S poles substantially perpendicular to surface 14. Magnet 24 is carried spaced apart from particles 20 at a distance 30, selected as a function of the strength, rate of relative movement between magnet 24 and article surface 14, and the viscosity of matrix or medium 18 in which the particle is disposed. This provides a torque force to turn particles 20 in fluid matrix 18 with the major dimensions 22 generally along article surface 14, as the last effective portion of magnetic field 26 passes each particle, as discussed above. With such disposition of the direction 29 of magnetic field 26 in FIG. 2, the combination of the distance between magnet 24 and particles 20 reduces the torque force from magnetic field 26 on each particle 20 as the major dimension of each particle moves to approach the plane of the article surface. For example, when the major dimension 22 of a particle 20 is substantially parallel with article surface 14 over which the particle is disposed, the torque force will be zero. After such orientation of the particles, the viscosity of the fluid matrix was increased, such as by curing, to secure each particle in position. Resulting from practice of the form of method described in connection with FIG. 2 was an article coated with non-spherical particles each of which includes a major dimension. An average of at least about 50% of the major dimensions were oriented generally along the article surface in respect to which the particle is disposed.

Magnetic field 26 in FIG. 2 was disposed with its direction 29 substantially perpendicular to article surface 14. However, it has been observed during evaluation of the present invention that direction 29 of magnetic field 26 can vary within a range of about 30° of perpendicular in the practice of that method form of the invention. The angle or tilt of direction 29 to article surface 14, within such range, was selected as a function of the shape of the magnet and the ability of the magnetic field to position the particles along the article surface, particularly if the article surface was non-planar, as the above described substantially relative parallel movement was provided.

Figure 3:
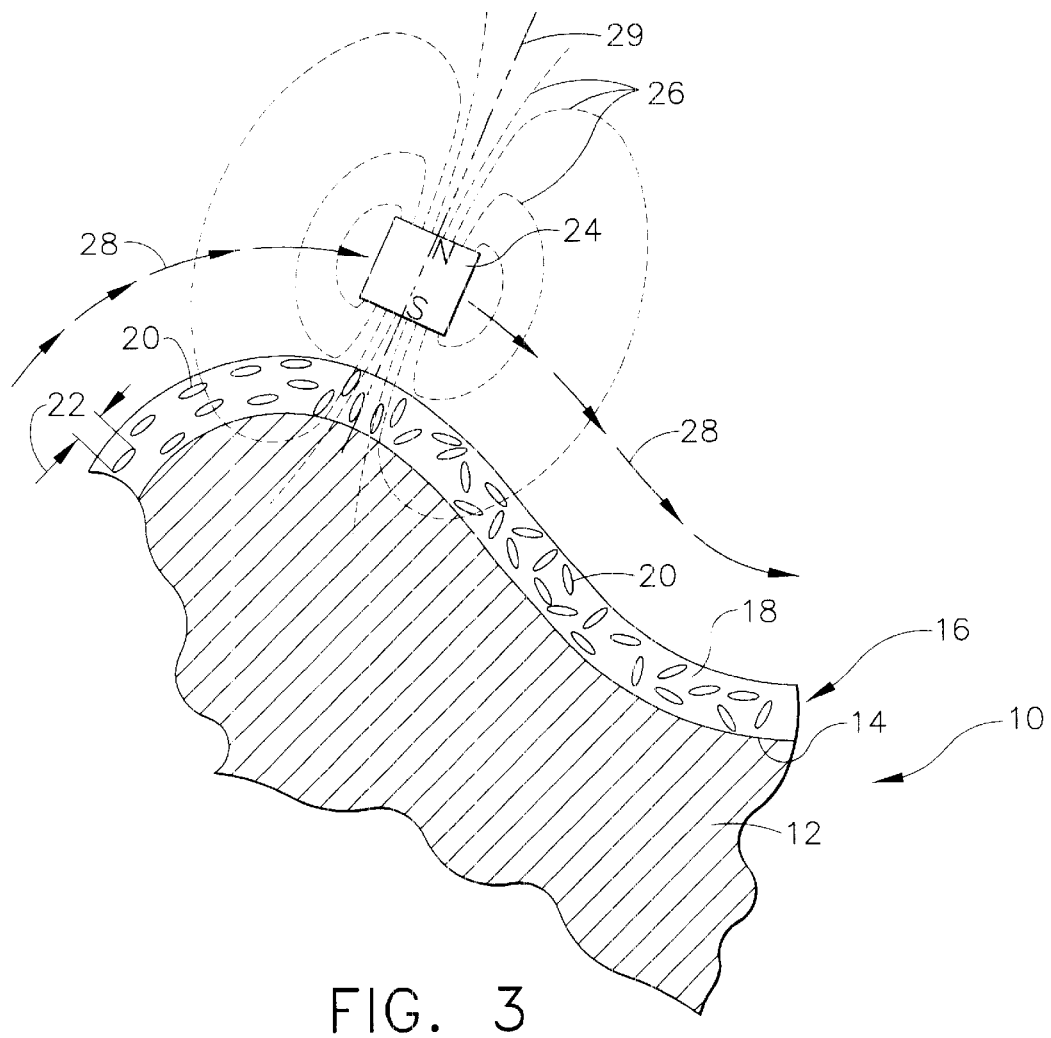
FIG. 3 is a diagrammatic fragmentary sectional view of the embodiment of FIG. 2 applied to a complex, non-planar article surface.

FIG. 3 shows one form of practice of the method generally represented by the arrangement of magnetic field 26, magnet 24 and article surface 14, as described in connection with FIG. 2. Article surface 14 in FIG. 3 is of a complex three dimensional, non-planar shape, such as might exist on the surface of a component of a power generation apparatus, for example a turbine engine component such as an airfoil, combustor, strut, frame, cowling, etc. The above-described known methods for particle orientation cannot be used effectively for orienting particles 20 on such a surface.

In practice of that form of the present method shown in FIG. 3 on a complex article surface, magnet 24 is carried spaced apart from particles 20 by a support member. Such support member can be a commercial machine tool carrier, robotic device or numerical controlled apparatus well known and used commercially and, therefore, not shown. Such a support member can be controlled or programmed to move magnet 24 along a path, shown by arrows 28 in FIG. 3, which follows the contour of article surface 14. In this embodiment, the relationship of direction 29 of magnetic field 26 to article surface 14 was maintained substantially constant as magnet 24 was moved along path 28. After such orientation of particles 20, the viscosity of matrix 18 was increased such as by curing to secure the particles in position. Practice of the form of the invention represented by FIG. 3 resulted in an article comprising a non-planar surface coated with non-spherical particles, each of which includes a major dimension. An average of at least about 50% of the major dimensions were oriented generally along the article surface in respect to which the particle was disposed.

During practice of the method forms described in connection with FIGS. 2 and 3, matrix 18 of coating 16 was maintained in a fluid condition for a time sufficient to enable particles 20 to be moved, such as in rotation, by magnetic field 26. However, effect of magnetic field 26 on each particle, as the field and particle pass. relative one to the other, can move a particle along surface 14 slightly in the direction of the relative movement. Therefore, it is preferable in the form of the invention related to FIGS. 2 and 3 to move or "scan" magnet 24 and surface 14 relative one to the other in a back and forth type motion, for example one similar to the pattern shown in FIG. 4. Use of such a relative motion avoids moving the particles through the matrix toward one portion of the surface while the matrix is fluid. For convenience, the pattern has been that of a coating application apparatus, such as a robotic paint sprayer.

Figure 5:
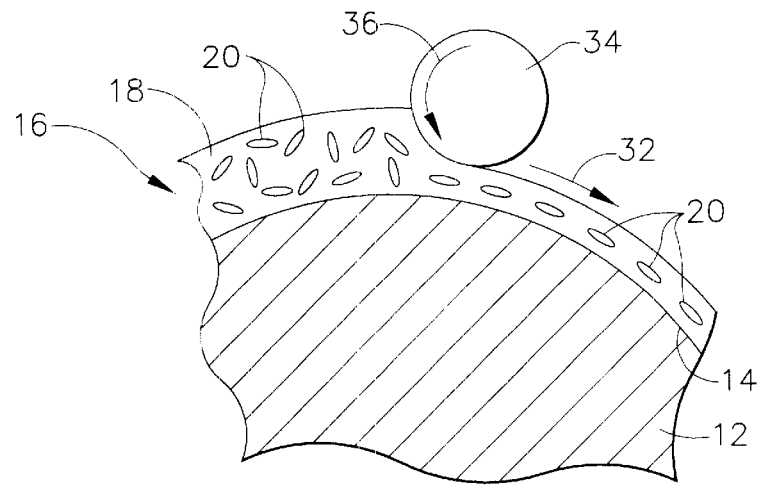
FIG. 5 is a diagrammatic fragmentary sectional view of a coated article with a form of the method of the present invention in which force to orient the particles generally along the article surface is provided by inducing flow of the medium by applying external pressure to the medium carrying the particles by rolling.
Figure 6:
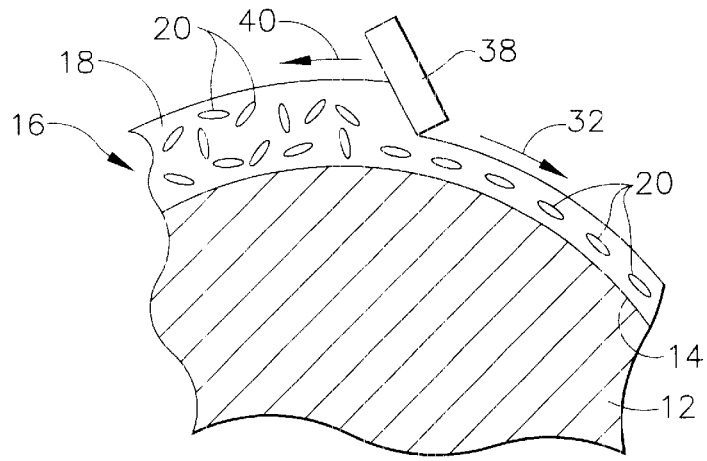
FIG. 6 is a diagrammatic fragmentary sectional view of a coated article with a form of the method as in FIG. 5 in which flow in the medium is provided by pulling a blade member across the medium.

As was mentioned above, another form of the method of the present invention for orienting a non-spherical particle generally along an article surface over which the particle is disposed is by inducing flow in a medium carrying the particle. Such movement of the medium, in turn, applies a force on the particle to turn the particle in the direction of flow. Examples of that form of the method are shown in FIGS. 5 and 6. A coating, disposed on article surface 14, shown to be non-planar, includes a fluid medium or matrix 18 and non-spherical particles 20, all as described above. Initially, particles 20 are positioned at random in matrix 18, as shown at the left of those figures. While matrix 18 is in a fluid condition, flow, represented by arrow 32, is induced in the matrix in the direction shown. Such flow applies a force to and causes movement and orientation of the particles in the direction of flow, substantially parallel with surface 14. Such orientation can occur even if article surface 14 is non-planar.

In the embodiment of FIG. 5, roller 34 was used to induce flow in matrix 18 on article surface 14 through rotation of roller 34 as shown by arrow 36 against the matrix. In the embodiment of FIG. 6, a doctor blade 38 was used to induce flow in matrix 18 on article surface 14 by movement in a direction shown by arrow 40. Flow of matrix 18, applying a force to orient particles 20, resulted in particles 20 being positioned substantially parallel with article surface 14. Such particle orientation and positions are shown at the right of FIGS. 5 and 6, behind the movement of the means 34 and 38, represented by the roller and the doctor blade, which induce flow in fluid matrix 18. After the viscosity of matrix 18 was increased, such as by curing, provided was an article surface coated with non-spherical particles oriented generally along the article surface.

Figure 7:
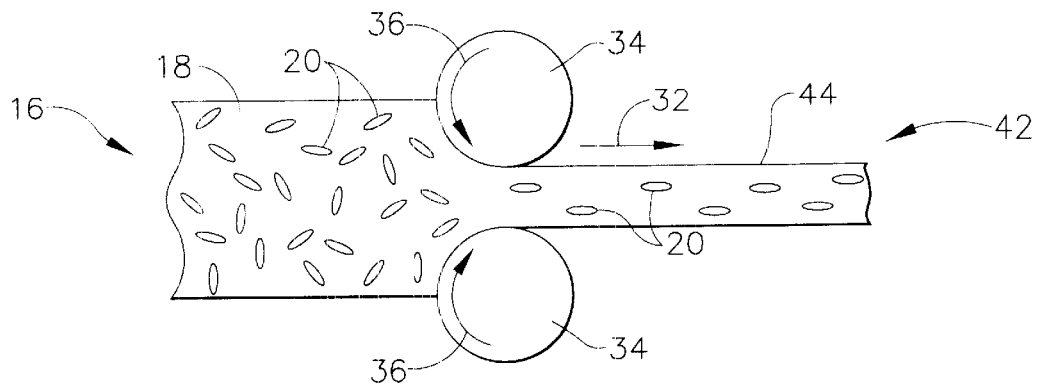
FIG. 7 is a diagrammatic view of the method generally as in FIG. 5 using rolling to provide a sheet of material including oriented particles.
Figure 8:
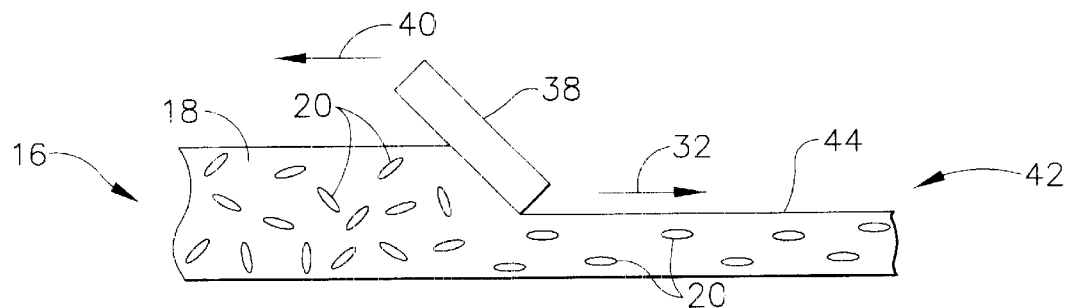
FIG. 8 is a diagrammatic view of the method generally as in FIG. 6 using a blade member in a tape casting type of operation to provide a sheet of material including oriented particles.

The diagrammatic views of FIGS. 7 and 8 show the above form of the method of the present invention using inducement of flow in a fluid matrix to orient non-spherical particles in the provision of sheets of material. These forms are similar, respectively, to conventional commercial rubber rolling and tape casting methods using commercially available equipment. After preparation of sheet preforms 42 including a sheet or article plane surface 44, a sheet article is provided by increasing the viscosity of the matrix, as described, to secure the particles in position generally along surface 44 of the sheet extending in the direction of flow 32. In FIG. 7, a pair of rollers 34, opposed one to the other, was used, with rollers 34 rotating in the directions shown by arrows 36. During evaluation, it was recognized that it was preferred to turn or rotate the sheet at different angles, for example about 90°, between rolling operations.

Another form of the method associated with the present invention includes using gravity as the force to orient the particles. In that form, represented by the diagrammatic sectional view of FIG. 9, matrix 18 is maintained in a fluid condition for a time sufficient to allow gravity, represented by arrow 46, to move at least about 50% of particles 20 with the major dimension generally along article surface 14.

Figure 4:
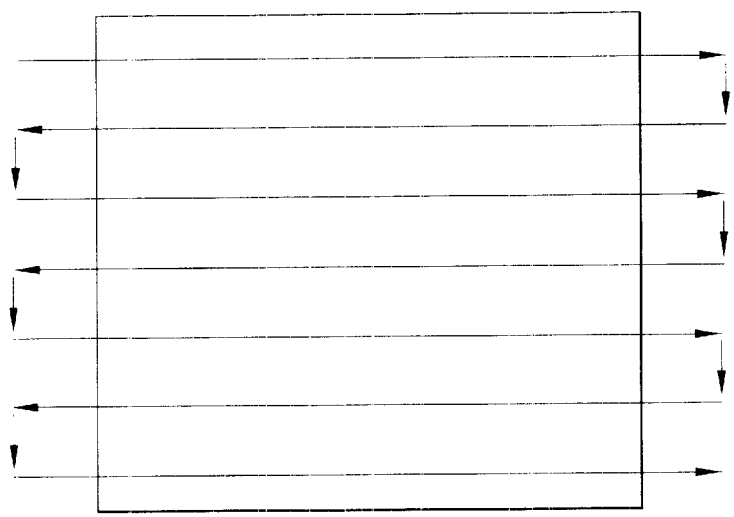
FIG. 4 is a diagram of a preferred movement or scan pattern for the form of the method shown in FIGS. 2 and 3.

During evaluation of the method form represented by and discussed in connection with FIGS. 2, 3 and 4, flakes of a soft Fe—Co—Al type of ferromagnetic material, comprising nominally by weight about 48% Fe, 40% Co, and 12% Al, were used. The flakes had an aspect ratio of flake major dimension or diameter to flake thickness in the range of about 10–100, more preferably in the range of about 10—50. For example, in one series, the Fe-based alloy flakes had a thickness of about 1 micron and a diameter of about 20 microns, within a specifically preferred aspect ratio range of about 15–30. The flakes were mixed with an epoxy resin as a fluid matrix at a volume loading of flakes to resin of about 10%.

The fluid mixture of ferromagnetic flakes and epoxy resin was cast on a surface of commercially available 6061T6 Al alloy specimens 6"×6"×0.05" to a coating thickness of about ⅛". While the epoxy resin matrix was in a fluid, uncured condition, one specimen was scanned at 0.10" increments at the rate of about 2 inches/second in the pattern shown in FIG. 4. A 0.375" long×1" diameter samarium-cobalt disk magnet was held at a distance of about ½" from the article surface, within the preferred distance range of about ¼–1.5", substantially perpendicular to the article surface. This provided a magnetic force on the flakes sufficient to turn the flakes for desired orientation. The magnetic field, produced in this evaluation on the particles passing the centerline or core line of the magnet, was in the range of about 700 oersteds, within the preferred range of about 100–1000 oersteds for such distance and particles. Less than about 100 oersteds applies insufficient torque to move the particle, and greater than about 1000 oersteds applies excessive torque to the particle to pull it out of the matrix or to move it along in an excessive amount through the matrix. After the above-described scanning with the magnetic field, the coating including an epoxy matrix carrying the oriented flakes was allowed to cure by air drying for about 4 hours, thereby increasing the viscosity of the resin matrix and securing the particle flakes in their positions developed by the magnetic scanning. Another of such specimens as a control specimen was cast and cured by air drying in the same way but not exposed to any magnetic field before curing, but still allowing gravity to act on the flakes.

The orientation of the magnet particle flakes in each of the specimens was determined. The orientation of the control specimen was measured to have about 50% of the flakes with the major dimension/diameter oriented generally along the surface of the control specimen article. The specimen that had been scanned with the magnetic field, as described above, was measured to have at least about 70% of the flakes with the major dimension/diameter generally along the surface of the specimen article. Therefore as used herein if not otherwise stated, the position of a plurality of the particles in respect to the article surface with which each particle is associated means that at least about 50% of the particles are so positioned.

As mentioned above, consistent with discussion in the above-identified patents, a purely random sample of an untreated mixture, cured without regard to the length of time a matrix is fluid, has about 33% of the flakes with a major dimension oriented generally along a surface. In the above evaluation, the larger approximate 50% orientation of flakes generally along the article surface in the control specimen resulted from the matrix being curing relatively slowly by air drying. This longer time of drying enabled the force of gravity to move and position a greater amount, at least about 50%, of the particle flakes generally along the surface. This evaluation confirmed the method form described in connection with FIG. 9 that the selection of the type of particle along with the viscosity of the matrix and the time during which the matrix is maintained fluid can be used to provide an improvement in orientation of non-spherical particles.

The directional flow method represented by, and described in connection with, FIGS. 7 and 8 for the preparation of sheets of material including oriented non-spherical particles can be conducted using conventional rubber rolling or tape casting equipment. In one evaluation of that form of the method of the present invention, the above-described metallic flakes were mixed at a flake volume loading of about 15% by calendaring into an uncured rubber compound commercially available as Viton rubber. After mixing, rubber sheets to a thickness of about 0.060" were rolled out as shown in FIG. 7 and cured using commercial rubber curing. The orientation of the flakes in the rolled and cured rubber sheet was determined as above. Measurement showed that over 80% of the flakes in the rubber sheet were oriented substantially parallel with the surface or plane of the sheet.

Another form of the method of the present invention employs the surface tension of the matrix to apply a force to turn the non-spherical particles so that their major dimension generally is along the article surface. In this form, the matrix viscosity and concentration are selected to provide an appropriate surface tension for a selected particle. Referring to the fragmentary sectional view of FIG. 10, coating 16 includes a plurality of thin layers 50 each including particles 20 in matrix 18, as described above. When matrix 18 is in fluid form, a surface tension in the fluid, represented by two headed arrow 48, applies a force primarily within an outer portion of coating 16, if the coating is relatively thick. However, by applying a plurality of relatively thin coatings or layers, for example preferably about 0.008–0.012" thick, the surface tension force acts substantially on the entire layer to orient the particles. Such force moves particles 20 in each layer 50 so that their major dimension generally is along surface 14 of substrate 12.

Figure 9:
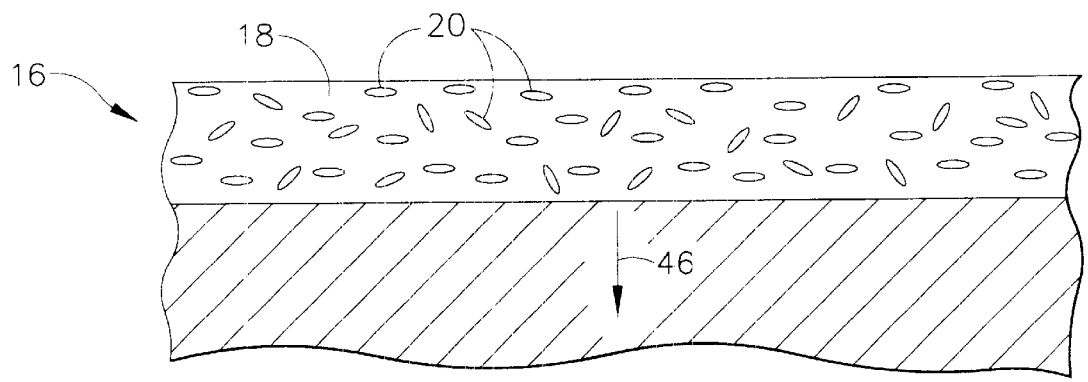
FIG. 9 is a diagrammatic fragmentary sectional view of a coated article with a form of the method of the present invention in which the force of gravity is used to orient a majority of the major dimensions of the particles generally along the article surface.
Figure 10:
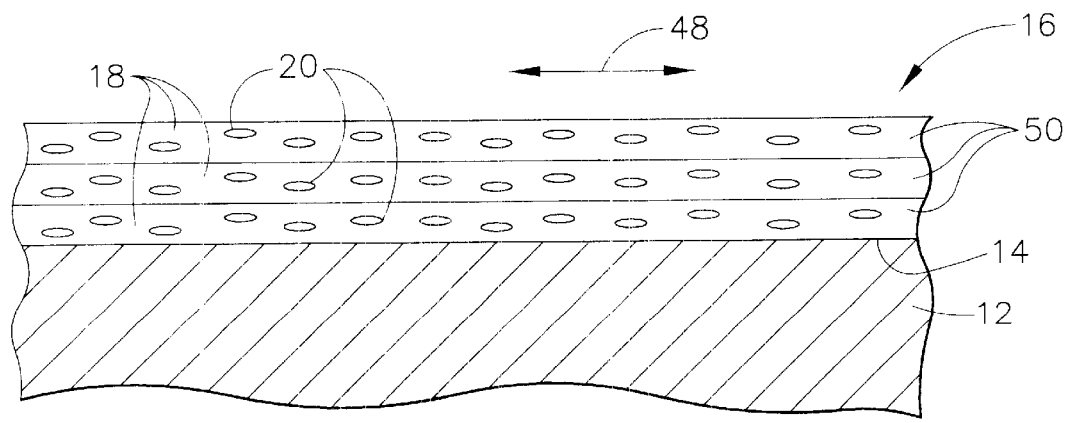
FIG. 10 is a diagrammatic fragmentary sectional view of a coated article as in FIG. 9 in which the force used to orient the particles is the force of surface tension.

Other evaluations confirmed a combination of the method forms described in connection with FIGS. 9 and 10. This combined the application of the forces of gravity and surface tension in a multi-layer coating, the matrix of which was maintained fluid for a time sufficient to enable that combination of forces to orient at least about 50% of the particles. In that evaluation, the particles were flakes of an iron base alloy and had an aspect ratio of about 16 to 1. The binder of the coating material was a water base ceramic-type binder with a particle concentration of about 18–19 volume percent. Specimen substrates of an alloy based on Ti and of an alloy based on Ni were sprayed with 6 layers of the coating material, each of a thickness of about 0.010", to a total coating thickness of about 0.060". After each 0.010" layer was applied, the layer matrix was held for about 20–40 minutes to cure the layer before a subsequent layer was applied. This time of curing of each layer was sufficient for the combined forces of gravity and surface tension to orient about 60% of the flakes with their major dimension generally along the surface of the specimen. This combination of the forces of gravity and surface tension improved the about 50% orientation of the control specimen in the above example relating to gravity alone to about 60%, as compared with a normal, purely random, untreated mixture at about 33%.

The present invention can apply to any substrate, metallic or non-metallic. However, it is recognized that use of that form of the method employing a magnetic field in connection with a substrate that itself is ferromagnetic can change the flow of the magnetic field within the substrate as a result of interaction there between. Therefore, the strength and direction of the magnetic field in respect to the particles can be adjusted within the scope of the present invention to consider the interaction between the substrate and the magnetic field.

The present invention has been described in connection with a variety of specific forms, embodiments, examples, materials, etc. However, it should be understood that they are intended to be representative of, rather than in any way limiting on, the scope of the invention. Those skilled in the various arts involved will understand that the invention is capable of variations and modifications without departing from the scope of the appended claims.

What is claimed is:

1. A coated article including a non-planar article surface and a coating on the article surface comprising a plurality of non-spherical particles disposed in the coating on the article surface in a non-metallic matrix about the particles, each particle having a major dimension, the combination in which:

the coating is integral with the article surface;

an average of at least about 50% of the major dimensions of the particles are oriented generally along the non-planar article surface in respect to which the particle is disposed;

the article surface is of a complex, three dimensional non-planar shape; and, the non-spherical particles are metallic flakes having an aspect ratio in the range of about 10–100 in the non-metallic matrix to enable positioning of the average of at least 50% of the major dimensions of the metallic flakes along the complex, three dimensional, non-planar shape of the article surface.

2. The article of claim 1 in the form of a component of a power generating engine.

3. The article of claim 1 in the form of a component of a vehicle.

4. The article of claim 1 in which the metallic flakes have an aspect ratio in the range of about 15–30.

5. The article of claim 1 in which the metallic flakes are magnetic.

* * * * *